No. 637,815. Patented Nov. 28, 1899.
N. MUSLAR.
MILK URN.
(Application filed Aug. 3, 1899.)
(No Model.)
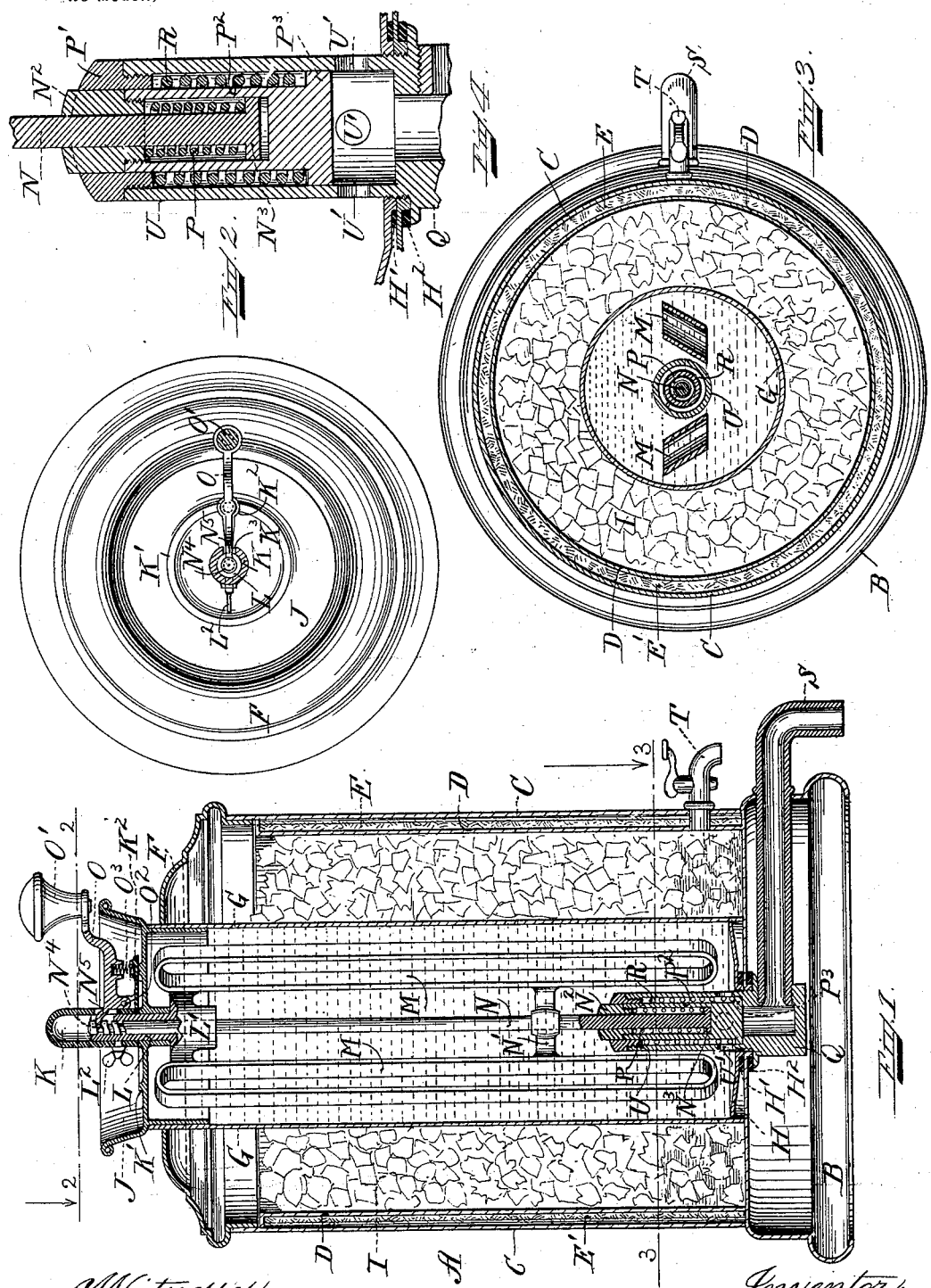

UNITED STATES PATENT OFFICE.

NELSON MUSLAR, OF WORCESTER, MASSACHUSETTS, ASSIGNOR TO HARRY H. FAIRBANKS, OF SAME PLACE.

MILK-URN.

SPECIFICATION forming part of Letters Patent No. 637,815, dated November 28, 1899.

Application filed August 3, 1899. Serial No. 726,005. (No model.)

*To all whom it may concern:*

Be it known that I, NELSON MUSLAR, of Worcester, in the county of Worcester and State of Massachusetts, have invented certain new and useful Improvements in Milk-Urns, of which the following is a specification.

My invention relates to improvements in milk-urns; and the object is to produce an apparatus for holding milk and cream and to deliver therefrom milk of uniform quality. At present, so far as known to me, in the urns in use the cream rises to the top, so that, in drawing off, skim-milk is first supplied instead of a mixture of milk and cream, and no cream is drawn until the supply of skim-milk is exhausted, and, further, in the present urns the milk and cream being on the outside of the ice-chamber are liable to sour, as they are thus exposed to the heat. By my arrangement the above objections are avoided, inasmuch as the cream and milk are agitated and mixed before being delivered, and no liquid can be drawn from the apparatus without previous agitation and mixture, the mixing of the cream and milk always taking place before the drawing off. Further, by my construction the milk being surrounded by ice no matter what the weather may be the ice must first melt and the ice-water become warm before the milk can sour. The ice is protected by a surrounding chamber, which may be filled with a heat-non-conducting material to protect the ice against heat.

My invention consists of certain novel features hereinafter described, and particularly pointed out in the claims.

In the accompanying drawings, which illustrate a construction embodying my invention, Figure 1 is a central sectional view through my improved milk-urn. Fig. 2 is a plan view taken on the line 2 2, Fig. 1. Fig. 3 is a cross-sectional view through the apparatus on the line 3 3, Fig. 1. Fig. 4 is an enlarged detail sectional view showing the valve raised to allow the withdrawal of liquid.

Like letters of reference refer to like parts throughout the several views.

The milk-urn A is provided with a hollow base B, upon the upper side of which rests the outer cylinder C, the lower edges of which are soldered to the top of the base B. Within the cylinder C is located another cylinder D, the lower edges of which are soldered to the base B. The chamber E, formed by these two cylinders, is preferably filled with heat-non-conducting material $E'$, as ground cork, to protect the ice I within the cylinder D, and resting on top of the cylinder C is a cover F. Within the cylinder D is located another cylinder G, the lower edges of which rest on the top of the base B, and located upon the upper edges of said cylinder G is a cover J. Located in the cover J is a sleeve K, and projecting upwardly into said sleeve K is a sleeve L, provided at its lower end with a cross-piece $L'$, to which are secured the agitators M. The sleeve L is held fast in the sleeve K by means of the set-screw $L^2$. The shaft N extends from the upper edge of the sleeve L through the cross-piece $L'$, through the cross-piece $N'$, then through the stuffing-box $N^2$, and terminates in the flange-bottom $N^3$. The upper end of the shaft N is provided with a spiral thread $N^4$, with which engages the finger $N^5$ on the arm O, having a suitable handle $O'$ and held in its normal position, as shown, by the spring $O^3$, with the finger $N^5$ in the top of the spiral groove $N^4$ and pivoted on the sleeve K at the point $O^2$. The sleeve K and the sleeve L move with the arm O, as they are connected to move as one. The horizontal extension $K^2$ of the sleeve K is recessed to support the lower end of the spring $O^3$, and during the movement of the arm O said extension slides along the rib $K'$, formed in the bottom of the cover J. The shaft N is held in its normal position, as shown in Fig. 1, by the spring P, which rests at its lower end against the flange-base $N^3$ and at its upper end against the stuffing-box $N^2$. Screw-threaded on the lower end of the stuffing-box $N^2$ is a cylinder $P^2$, which at its lower end carries the valve $P^3$, which is held in its normal closed position down on its seat in the valve-casing Q by spring R, the lower end of which spring rests upon the top of the valve $P^3$ and the upper end rests against the bottom of the stuffing-box $P'$. The bottom H of the milk-chamber is screw-threaded and meshes with the thread on the valve-casing Q. The packing $H'$ is secured tightly in place between the bottom H of the milk-chamber and the top of the base B, and the packing H² is secured in place between the base B and the valve-casing Q, and by means of these two packings no liability of leakage of the liquid is incurred. The valve-casing Q is provided with an upwardly-extending cylinder U, which is screw-threaded on the outside of the stuffing-box P', and said cylinder is provided with the ports U', through which the mixture of cream and milk passes from the milk-chamber G to the discharge-pipe S, which is connected to the valve-casing Q.

A suitable nozzle T is provided for drawing off the ice-water from the ice-chamber, the ice-water serving two purposes—that of cooling the milk and also may be drawn off to drink.

The operation of the apparatus is as follows: With the apparatus in its normal position (shown in Fig. 1) when no liquid is being drawn off and it is desired to draw liquid the operator takes hold of the handle O' of the arm O and turns it to the right, which turns the agitators M and mixes the liquid, producing a uniform quality throughout. After the handle O' turns three complete revolutions, the finger N⁵ has moved around the spiral groove N⁴ and has lifted the shaft N against the tension of the spring P and fully compressed said spring, Fig. 4, and as the fourth complete revolution of the arm O takes place the valve P³ is raised against the tension of the spring R, and the spring P being fully compressed the upward movement of the shaft N acts on the stuffing-box N² and raises the valve P³ and the liquid passes through the ports U' into the bottom of the valve-casing Q and out through the discharge-pipe S, of which there may be any number leading from the valve-casing Q. When the required amount of liquid has been drawn, the arm O is pressed down against the spring O³, which pulls the finger N⁵ out of the spiral groove N⁴ and releases the shaft N, which allows the springs R and P to act, which causes the valve P³ to close on its seat in the valve-casing Q, followed by the downward movement of the flange-bottom N³ when the apparatus is in its normal position, no liquid being drawn.

It is obvious that this apparatus might be used for chocolate, medicine, or any liquid which requires stirring before serving. The stirring arrangement and the valve connection may be attached to any liquid apparatus, so that the contents when delivered are uniform in quality.

If it be desired, with the parts in normal position, as shown in Fig. 1, to agitate the liquid without drawing off, the handle O' of the arm O is moved toward the left and the finger N⁵ will pass out of the spiral groove N⁴ without affecting the shaft N, but the sleeve K, sleeve L, and agitators M will be turned by the movement of the arm O, thus preserving the uniform quality of the liquid.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In an apparatus of the character specified, a chamber for holding liquid, an outlet for said liquid, a valve normally closing said outlet, means for agitating the liquid in said liquid-chamber, means for opening said valve to allow the discharge of liquid through said outlet, and means for holding said valve closed until the liquid has been agitated.

2. In an apparatus of the character specified, a chamber for holding liquid, an outlet for said liquid, means for agitating the liquid in said liquid-chamber, means for opening said valve to allow the discharge of liquid through said outlet, and yielding means for holding said valve closed until the liquid has been agitated.

3. In an apparatus of the character specified, a chamber for holding liquid, an outlet for said liquid, a valve normally closing said outlet, an agitator for the liquid in said chamber, means for opening said valve, mechanism for operating said agitator to agitate the liquid and for subsequently opening the valve to allow the discharge of liquid through said outlet, and means for holding said valve closed until the liquid has been agitated.

4. In an apparatus of the character specified, a chamber for holding liquid, an outlet for said liquid, a valve normally closing said outlet, an agitator for the liquid in said liquid-chamber, means for opening said valve, and an operating device common to said agitator and said valve-opening means for agitating the liquid and for subsequently opening the valve to allow the discharge of liquid through said outlet.

5. In an apparatus of the character specified, a chamber for holding liquid, an outlet for said liquid, a valve normally closing said outlet, an agitator for the liquid in said liquid-chamber, means for opening said valve, an operating device common to said agitator and said valve-opening means for agitating the liquid and for subsequently opening the valve to allow the discharge of liquid through said outlet, and means for holding said valve closed until the liquid has been agitated.

6. In an apparatus of the character specified, a chamber for holding liquid, an outlet for said liquid, a valve normally closing said outlet, an agitator for the liquid in said liquid-chamber, means for opening said valve, an operating device common to said agitator and said valve-opening means for agitating the liquid and for subsequently opening the valve to allow the discharge of liquid through said outlet, and means for closing said valve upon the removal of said common device from engagement with said valve-opening means.

7. In an apparatus of the character specified, a chamber for holding liquid, an outlet for said liquid, a valve normally closing said outlet, an agitator for the liquid in said liquid-chamber, means for opening said valve, an operating device common to said agitator and said valve-opening means for agitating the liquid and for subsequently opening the valve to allow the discharge of liquid through said outlet, means for closing said valve upon the removal of said common device from engagement with said valve-opening means, and a spring for holding said common device normally in engagement with said valve-opening means.

8. In an apparatus of the character specified, a chamber for holding liquid, an outlet for said liquid, a valve normally closing said outlet, an agitator for the liquid in said liquid-chamber, means for opening said valve, an operating device common to said agitator and said valve-opening means for agitating the liquid and for subsequently opening the valve to allow the discharge of liquid through said outlet, and yielding means compressed by the opening of said valve for closing said valve upon the removal of said common device from engagement with said valve-opening means.

9. In an apparatus of the character specified, a chamber for holding liquid, an outlet for said liquid, a valve normally closing said outlet, yielding means for holding said valve normally closed, a cooling-chamber surrounding said liquid-chamber, an agitator for the liquid in said liquid-chamber, a rod yieldingly connected to said valve and provided on its upper end with a spiral groove, an arm operatively connected to said agitator and having a finger which engages said spiral groove in the valve-rod, and a spring normally holding said finger in said spiral groove, the said arm being adapted in its movement to operate said agitator to agitate the liquid and to subsequently open said valve by moving the valve-rod upwardly against said yielding means which closes said valve upon the removal of said arm from engagement with said spiral groove in said valve-rod.

10. In an apparatus of the character specified, a chamber for holding liquid, an outlet for said liquid, an agitator for the liquid in said liquid-chamber, a valve normally closing said outlet, a cooling-chamber surrounding said liquid-chamber, an exterior chamber surrounding said cooling-chamber, a valve-controlled outlet for the water from said cooling-chamber, mechanism for operating said agitator to agitate the liquid and for subsequently opening the valve to allow the discharge of liquid from said outlet, and means for holding said valve closed until the liquid has been agitated.

In testimony whereof I have signed my name to this specification, in the presence of two subscribing witnesses, this 25th day of July, A. D. 1899.

NELSON MUSLAR.

Witnesses:
  A. L. MEASER,
  V. M. MACLELLAN.